(Model.)
W. N. PARRISH.
TENSION APPARATUS FOR WIRE FENCES.
No. 334,801. Patented Jan. 26, 1886.
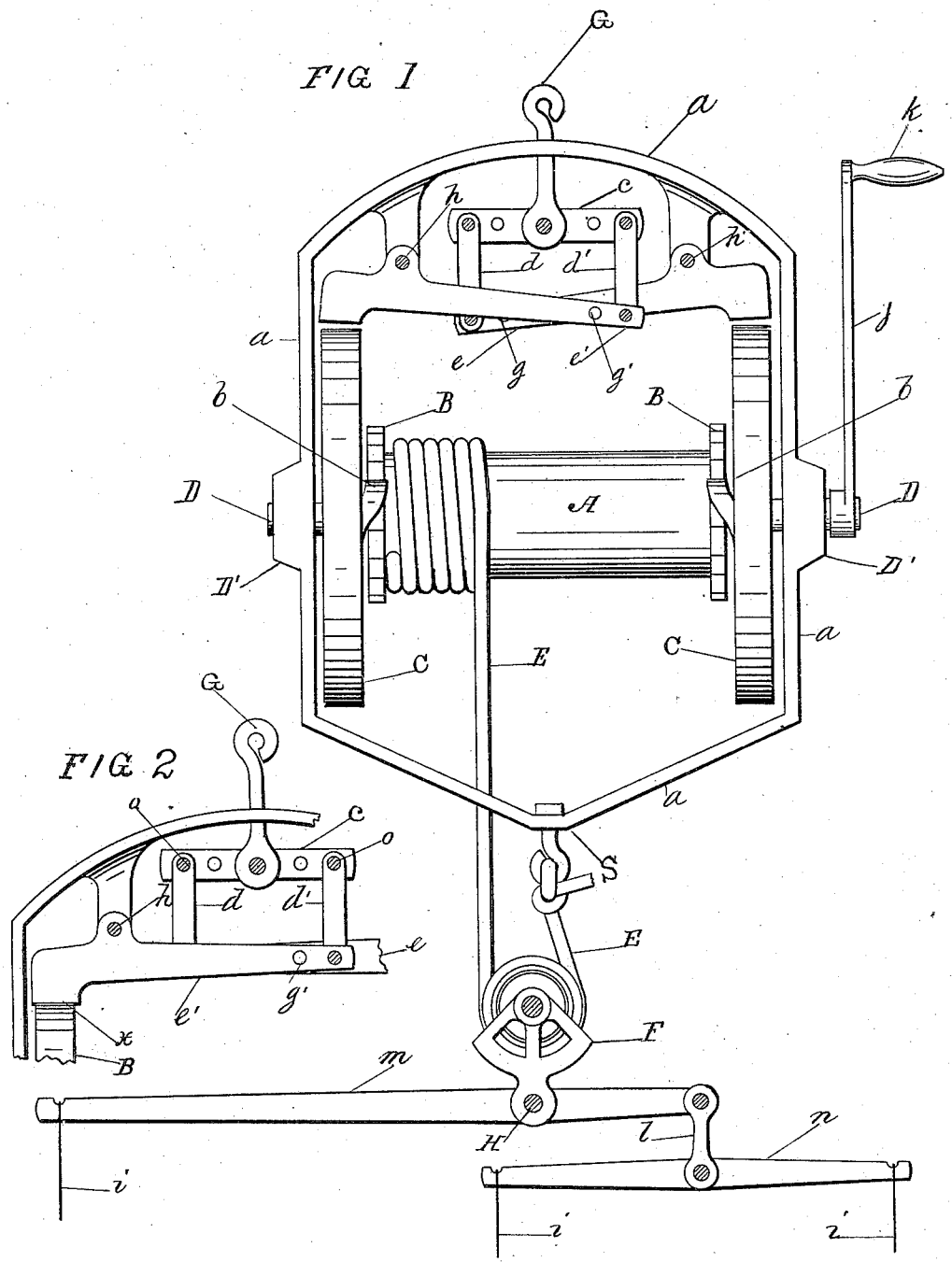
Witnesses
William G. Needham
Caleb S. DuKadway
Inventor
William N Parrish
by W. I. Dennis
atty

UNITED STATES PATENT OFFICE.

WILLIAM N. PARRISH, OF RICHMOND, INDIANA.

TENSION APPARATUS FOR WIRE FENCES.

SPECIFICATION forming part of Letters Patent No. 334,801, dated January 26, 1886.

Application filed August 7, 1885. Serial No. 173,884. (Model.)

*To all whom it may concern:*

Be it known that I, WILLIAM N. PARRISH, a citizen of the United States, residing at Richmond, in the county of Wayne and State of Indiana, have invented certain new and useful Improvements in Tension Apparatus for Wire Fences, of which the following is a specification, reference being had therein to the accompanying drawings, in which—

Figure 1 is a plan view of the machine, the equalizing-arms being shown at right angles from their normal position. Fig. 2 is a detail of the frame, hook, and levers.

My invention relates to that class of machines used to strain the wires in the construction of fences in which wire forms a part.

It consists in a windlass-shaft provided with a crank, and a rope coiled around the windlass and connected to a pulley-block, to which are attached equalizing-bars, to which the wires are secured.

It also further consists in a frame having hinged arms and levers, said levers being brought in contact with the faces of ground-wheels by the strain produced by the windlass-rope and pulley-block.

In the drawings, $a\ a\ a$ represent an iron frame, the sides of which are parallel and the ends of circular or angular form. The sides of the frame $a$ are provided with projections D', constructed to serve as bearings for main shaft D, on which are loosely mounted ground-wheels C C, and to which are attached ratchet-wheels B B and a cylinder or drum, A, which revolve with it. A rope, E, is coiled upon the cylinder A and is wound upon it by means of crank $j$, having a handle, $k$. The outer end of the rope passes around a pulley in a pulley-block, F, and is attached to a hook, S, secured to the front or angular part of the frame. The pulley-block F is hinged to an equalizing-bar, $m$, at H. At the short end of the bar $m$ is attached a shorter bar, $n$, by means of a pivoted connection, $l$. To the long end of the bar $m$ and to each end of the bar $n$ are attached one or more wires, $i\ i\ i$, intended to be used in parallel lines at suitable distances from each other, to sustain vertical pickets, or to be used otherwise in the construction of a fence. The ground-wheels C C serve to bear the weight of the frame $a$ and its attachments in moving it from place to place. The ratchet-wheels B B are fast upon the shaft D and form the ends of drum or cylinder A, upon which is the rope E, so that in operating the cylinder to take up the rope it will produce a strain on the pulley-block and bars $m$ and $n$. The cylinder is secured at any point of its revolution by the pawls $b\ b$. Said pawls are carried by the wheels C C. At the opposite end of the frame $a\ a$ is placed an anchor-hook, G, which is attached to any suitable object to retain it in position. To one end of the hook G is secured at right angles a bar, $c$, to each end of which hinged arms $d\ d'$ are attached. The opposite ends of said arms $d\ d'$ are attached to the long ends of friction or brake levers $e\ e'$. The brake-levers $e\ e'$ are hinged to projections from the frame $a$ at $h\ h'$. By the action of the rope E and the cylinder A a strain is produced on the wires $i\ i\ i$, and a corresponding strain is communicated to the anchor-hook G, moving the hook and its bar $c$ toward the inner surface of the frame $a$, and carrying with it the outer ends of the friction-brake levers $e\ e'$, bringing the short ends of said brake-levers in contact with the faces of the ground-wheels C C, as shown at $x$, Fig. 2. The strain on the wires is thus converted into a force or pressure upon the faces of ground-wheels C C, acting as a lock which will prevent turning of the same in a degree proportioned to the strain upon the wires, after the manner of a lock or rubber upon the wheels of an ordinary wagon. The bar $c$ and the outer ends of the friction-brake levers $e\ e'$ are provided with holes by which the attaching-arms can be changed to graduate the leverage or strain as may be necessary.

The equalizing-bars $m$ and $n$ are intended to be so constructed as to produce an equal and uniform strain upon each of the wires $i$ with which they are connected.

Where the force exerted on the faces of the ground-wheels C C is sufficient to produce the necessary tension of the wires $i\ i\ i$, the ratchet-wheels B B need not be used.

The equalizing-arms $m\ n$ are intended to be used in a vertical position, although shown in the drawings in a horizontal position.

What I claim is—

1. A tension apparatus for wire fences, consisting of a frame having a shaft journaled therein, said shaft being rigidly provided with a drum having end ratchet-wheels, said shaft being also provided with wheels C C, loosely mounted thereon between the outsides of the ratchet-wheels and inside of the frame, the wheels C C having pawls $b\,b$, in combination with the rope E, block F, and equalizing-arms $m\,n$, said rope having one end secured to the drum and the other to the frame, the rope passing around the pulley-block F outside the frame, said block being pivoted to the arm $m$, and arm $n$ being linked to the arm $m$, substantially as described.

2. A tension apparatus for wire fences, consisting of a frame having a shaft journaled therein, said shaft being rigidly provided with a drum having end ratchet-wheels and outside crank, $j$, said shaft being also provided with wheels C C, loosely mounted thereon between the outsides of the ratchet-wheels and inside of the frame, the wheels C C having pawls $b\,b$, in combination with the rope E, block F, and equalizing-arms $m\,n$, said rope having one end secured to the drum and the other to the frame, the rope passing around the pulley-block F outside the frame, said block being pivoted to the arm $m$, the arm $n$ being linked to the arm $m$, substantially as described.

3. A tension apparatus for wire fences, consisting of a frame having a shaft journaled therein, said shaft having a drum with end ratchet-wheels secured thereto, and the wheels C C, provided with pawls $b\,b$, said wheels being loosely mounted on the shaft, in combination with the brake-levers $e\,e'$, fulcrumed in frame projections, the lever-actuating arms $d\,d'$, the cross-bar $c$, secured to said arms, and the anchor-hook G, centrally secured to the cross-bar $c$, substantially as described.

4. A tension apparatus for wire fences, consisting of a frame having a shaft journaled therein, said shaft being rigidly provided with a drum having end ratchet-wheels, wheels C C, loosely mounted on said shaft and provided with pawls $b\,b$, the rope E, pulley-block F, and equalizing-arms $m\,n$, said rope having one end secured to the drum and the other to the frame, the rope passing around the pulley-block F outside the frame, said block being pivoted to the arm $m$, and the arm $n$ being linked to the arm $m$, in combination with the brake-levers $e\,e'$, fulcrumed in frame projections, the lever-actuating arms $d\,d'$, the cross-bar $c$, secured to said arms, and the anchor-hook G, centrally secured to the cross-bar $c$, substantially as described.

In testimony whereof I affix my signature in presence of two witnesses.

WILLIAM N. PARRISH.

Witnesses:
JAMES W. NICHOLS,
W. T. DENNIS.